Inventor,
Levi B. Miller,
by
His Attorney.

Patented Aug. 4, 1925.

1,548,808

UNITED STATES PATENT OFFICE.

LEVI B. MILLER, OF LYNN, MASSACHUSETTS, ASSIGNOR TO GENERAL ELECTRIC COMPANY, A CORPORATION OF NEW YORK.

QUARTZ WORKING.

Application filed February 3, 1923. Serial No. 616,816.

*To all whom it may concern:*

Be it known that I, LEVI B. MILLER, a citizen of the United States, residing at Lynn, in the county of Essex, State of Massachusetts, have invented certain new and useful Improvements in Quartz Working, of which the following is a specification.

The present invention relates to the shaping or molding of quartz and its object is to provide a simple, convenient method of producing quartz articles of desired surface configuration.

The highly refractory nature of quartz renders molding of quartz difficult, as it is necessary to heat quartz to a very high temperature to obtain the required plasticity. Quartz does not become liquid like glass at high temperature, and, therefore, cannot be cast.

I have discovered that quartz may be molded or shaped by taking advantage of the expansion which occurs when crystalline quartz is brought by heat to a plastic condition.

Crystalline quartz as found in nature has a density of about 2.65. When this crystalline quartz is heated to fusion it is converted to the vitreous state with a density of about 2.21.

In accordance with my invention, crystalline quartz is packed in a mold, or other closed space, in such a manner that a molding pressure is exerted upon the material when plastic due to the expansion or swelling of the quartz at the transformation temperature.

Figure 1:
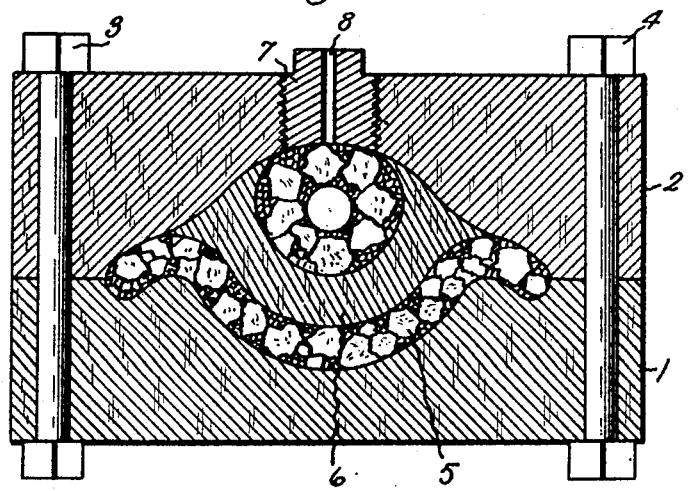
Figure 2:
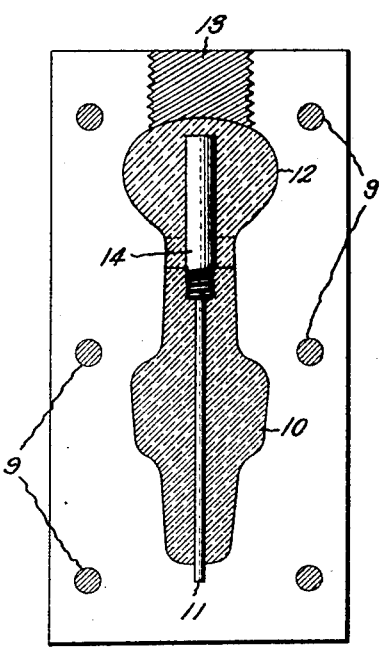

In the accompanying drawing, Fig. 1 is a horizontal section of a mold packed with quartz in accordance with my invention, and Fig. 2 illustrates a modification.

The mold shown in Fig. 1 comprises heavy-walled separable members 1, 2, consisting of suitable refractory material, such as graphite. The members are clamped together by the bolts 3, 4, also consisting of graphite. Within the mold crystalline quartz pieces 5 of suitable size and shape are so packed that the crystalline quartz occupies approximately 83 to 84% of the total volume of the mold. A core 6 may be placed within the mass which in the particular case illustrated is in the form of an electric insulator. A plug 7 contains a vent-hole 8 for the escape of superfluous material. The mass 5 consists of material of different sizes so as to fill the space within the mold to the best advantage.

When the mold has been securely clamped, it is heated in a suitable furnace to a temperature of about 1650° C. An electric resistance furnace may be used.

At 1650° C. the quartz becomes sufficiently plastic to cause the expansion of the material to fill out the confined space in the mold, superfluous material being expelled through the vent-hole 8. The transparency of quartz to heat rays insures the mass softening or fusing simultaneously throughout so as to form a homogeneous mass.

Fig. 2 is a sectional view of a mold suitable for producing silica spark plugs, the bolts or pins for holding the mold parts together being indicated at 9. The mold cavity is packed in part with a variety of crystal quartz (found in Maine deposits) which becomes spongy upon softening and expands to a greater degree than ordinary quartz. The chamber 10 is packed with ordinary quartz and contains a thin core 11 of graphite. The chamber 12 is packed with sponge-producing quartz. A plug 13 is inserted to close the cavity. The drawing also shows a threaded core 14 imbedded in the upper part of the cavity 10 to form a threaded opening in the finished plug for attaching a threaded member to the plug to which a binding post may be attached.

When the quartz is heated to the softening temperature of about 1650° C., the sponge-producing quartz exerts pressure upon the softened silica in chamber 10 to cause the same to fill out the mold. Upon cooling the core 11 may be removed and a wire may be cemented in its place, projecting at the lower end. A threaded external member (not shown) is applied to constitute the cooperating electric terminal. Molding of the quartz may be carried out in accordance with my invention at a materially lower temperature than would be required to fuse and mold quartz in separate steps and in separate devices. This lower molding temperature is advantageous as there is less tendency for the material to stick to the mold.

What I claim as new and desire to secure by Letters Patent of the United States, is:

1. The method of shaping quartz capable of conversion by heating to another modification of lower density which consists in confining said quartz in an enclosed mold in such quantity that when the quartz is heated to a temperature of plasticity the incidental increase of volume of said quartz will cause pressure to be exerted upon said material, said material being so arranged that this pressure will cause the surface of the plastic mass to conform to the configuration of the mold.

2. The method of shaping quartz which consists in heating crystalline quartz to plasticity in a confined space of desired configuration and thereby exerting a molding pressure upon the material by the expansion which occurs when quartz passes from one modification to another modification of lower density.

3. The method of shaping quartz which consists in confining crystalline quartz in such quantity in a mold that the increase in volume of said quartz when changing to the vitreous condition will fill said mold and thereupon heating said quartz to a temperature of about 1650° C., to render the same plastic and to cause conversion from the crystalline to the vitreous state.

4. The method of molding quartz which consists in packing a mold with pieces of crystalline quartz of such configuration that the spaces between the pieces in said mold do not substantially exceed 16% of the total volume of said mold and heating said quartz to a temperature sufficiently high to cause softening and expansion of said quartz, thereby causing said material to fill out the space in said mold.

5. The method of molding quartz which consists in confining quartz in a closed mold together with a segregated mass of sponge-producing quartz in sufficient quantity to cause a substantial pressure to be exerted upon the mass when fused by the expansion of said sponge-producing quartz, thereby causing the plastic mass to conform to the mold cavity.

In witness whereof, I have hereunto set my hand this 31st day of January, 1923.

LEVI B. MILLER.